(12) United States Patent
Zhang et al.

(10) Patent No.: US 12,549,710 B2
(45) Date of Patent: Feb. 10, 2026

(54) MULTIPLE HYPOTHESIS PREDICTION WITH TEMPLATE MATCHING IN VIDEO CODING

(71) Applicant: QUALCOMM Incorporated, San Diego, CA (US)

(72) Inventors: Yan Zhang, San Diego, CA (US); Han Huang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/639,557

(22) Filed: Apr. 18, 2024

(65) Prior Publication Data

US 2024/0357080 A1    Oct. 24, 2024

Related U.S. Application Data

(60) Provisional application No. 63/497,384, filed on Apr. 20, 2023.

(51) Int. Cl.
*H04N 19/105* (2014.01)
*H04N 19/159* (2014.01)
*H04N 19/176* (2014.01)

(52) U.S. Cl.
CPC ......... *H04N 19/105* (2014.11); *H04N 19/159* (2014.11); *H04N 19/176* (2014.11)

(58) Field of Classification Search
CPC ... H04N 19/105; H04N 19/159; H04N 19/176
See application file for complete search history.

(56) References Cited

U.S. PATENT DOCUMENTS

2024/0275941 A1\* 8/2024 Zhang ................... H04N 19/11
2024/0430474 A1\* 12/2024 Chubach .............. H04N 19/147

FOREIGN PATENT DOCUMENTS

WO    2023040993 A1    3/2023

OTHER PUBLICATIONS

Chen J., et al., "Merge Branch 'Fix-Valgrind-Errors' into 'Master'," ECM Software, Created on Jul. 22, 2021, pp. 1-3.
Coban M., et al., "Algorithm Description of Enhanced Compression Model 8 (ECM 8)", Editors, JVET-AC2025, Joint Video Experts Team (JVET) of ITU-T SG 16 WP 3 and ISO/IEC JTC 1/SC 29 29th Meeting, by teleconference, Jan. 11-20, 2023, pp. 1-74.

(Continued)

*Primary Examiner* — Tat C Chio
(74) *Attorney, Agent, or Firm* — Shumaker & Sieffert, P. A.

(57) ABSTRACT

A method of encoding or decoding video data includes determining, for a multiple hypothesis prediction (MHP) process, a plurality of prediction templates based on a plurality of weights; comparing the plurality of prediction templates to a current template of a current block; determining a weight from the plurality of weights based on the comparing of the plurality of prediction templates to the current template of the current block; determining one or more prediction hypotheses; determining a prediction signal for the current block based on the one or more prediction hypotheses and the weight; and encoding or decoding the current block based on the prediction signal.

20 Claims, 10 Drawing Sheets

(56) References Cited

OTHER PUBLICATIONS

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Liao R-L., et al., "EE2-2.2: Template Matching Based BCW Index Derivation for Merge Mode", JVET-AB0079-v1, Joint Video Experts Team (JVET) of ITU-T SG 16 WP 3 and ISO/IEC JTC 1/SC 29 28th Meeting, Mainz, DE, Oct. 20-28, 2022, pp. 1-3.

Winken M., et al., "CE10: Multi-hypothesis Inter Prediction (Test 10.1.2)", JVET-M0425-v2, Joint Video Experts Team (JVET) of ITU-T SG 16 WP 3 and ISO/IEC JTC 1/SC 29/WG 11 13th Meeting: Marrakech, MA, Jan. 9-18, 2019, pp. 1-13.

Winken M., et al., "CE10: Multi-Hypothesis Inter Prediction (Tests 1.2.a-1.2.c)", JVET-L0148-v3, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-12.

Winken M., et al., "CE10: Multi-Hypothesis Inter Prediction (Tests 1.5-1.8)", JVET-K0269-v1, Joint Video Experts Team (JVET) of ITU-T SG 16 WP 3 and ISO/IEC JTC 1/SC 29/WG 11, 11th Meeting: Ljubljana, SI, Jul. 10-18, 2018, pp. 1-14.

Winken M., et al., "Multi-Hypothesis Inter Prediction", JVET-J0041-v2, Joint Video Experts Team (JVET) of ITU-T SG 16 WP 3 and ISO/IEC JTC 1/SC 29/WG 11, 10th Meeting: San Diego, US, Apr. 10-20, 2018, pp. 1-10.

Zhang Y., et al., "Non-EE2: On MHP Weight Derivation", JVET-AD0338-v2, Joint Video Experts Team (JVET) of ITU-T SG 16 WP 3 and ISO/IEC JTC 1/SC 2930th Meeting, Antalya, TR, Apr. 21-28, 2023, pp. 1-3.

International Search Report and Written Opinion—PCT/US2024/025359—ISA/EPO—Jul. 23, 2024 (10 pp).

\* cited by examiner

MULTIPLE HYPOTHESIS PREDICTION WITH TEMPLATE MATCHING IN VIDEO CODING

This application claims the benefit of U.S. Provisional Application No. 63/497,384, filed Apr. 20, 2023, the entire contents of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for multiple hypothesis prediction (MHP) with template matching (TM). In the MHP process, for encoding or decoding a current block, a video coder (e.g., video encoder and video decoder) determines a prediction block (e.g., based on a motion or block vector or based on an intra-mode), and determines one or more prediction hypotheses (e.g., prediction signals from other blocks). The video coder determines a prediction signal for the current block based on the prediction block and one or more prediction hypotheses based on weights that may be applied to the prediction block and/or the one or more prediction hypotheses.

In one or more examples, the video coder may determine the weights for the MHP process based on template matching techniques. For instance, the video coder may determine a plurality of weights. In some examples, the video coder may select the weight of the plurality of weights that corresponds to a minimum template matching cost, which reduces the amount of information that is signaled to indicate the weight that is applied for the MHP process. In some examples, the video coder may sort the plurality of weights and corresponding hypotheses in a list based on corresponding template matching costs. The weight with a higher probability of being applied may be associated with a lower index into the list of weights. Signaling lower index values tends to require less bandwidth than higher index values. By sorting the weights as described, there may be reduction in the amount of information that is signaled.

In this way, the example techniques may promote an improvement to the MHP process for video coding. For instance, the example techniques provide a practical application of video coding techniques that may result in reduced bandwidth and signaling overhead.

In one example, this disclosure describes a method of encoding or decoding video data, the method comprising: determining, for a multiple hypothesis prediction (MHP) process, a plurality of prediction templates based on a plurality of weights; comparing the plurality of prediction templates to a current template of a current block; determining a weight from the plurality of weights based on the comparing of the plurality of prediction templates to the current template of the current block; determining one or more prediction hypotheses; determining a prediction signal for the current block based on the one or more prediction hypotheses and the weight; and encoding or decoding the current block based on the prediction signal.

In one example, the disclosure describes a device for encoding or decoding video data, the device comprising: one or more memories configured to store the video data; and processing circuitry coupled to the one or more memories, wherein the processing circuitry is configured to: determine, for a multiple hypothesis prediction (MHP) process, a plurality of prediction templates based on a plurality of weights; compare the plurality of prediction templates to a current template of a current block; determine a weight from the plurality of weights based on the comparing of the plurality of prediction templates to the current template of the current block; determine one or more prediction hypotheses; determine a prediction signal for the current block based on the one or more prediction hypotheses and the weight; and encode or decode the current block based on the prediction signal.

In one example, the disclosure describes a computer-readable storage medium storing instructions thereon that when executed cause one or more processors to: determine, for a multiple hypothesis prediction (MHP) process, a plurality of prediction templates based on a plurality of weights; compare the plurality of prediction templates to a current template of a current block; determine a weight from the plurality of weights based on the comparing of the plurality of prediction templates to the current template of the current block; determine one or more prediction hypotheses; determine a prediction signal for the current block based on the one or more prediction hypotheses and the weight; and encode or decode the current block based on the prediction signal.

The details of one or more examples are set forth in the accompanying drawings and the description below. Other features, objects, and advantages will be apparent from the description, drawings, and claims.

DETAILED DESCRIPTION

Figure 1:
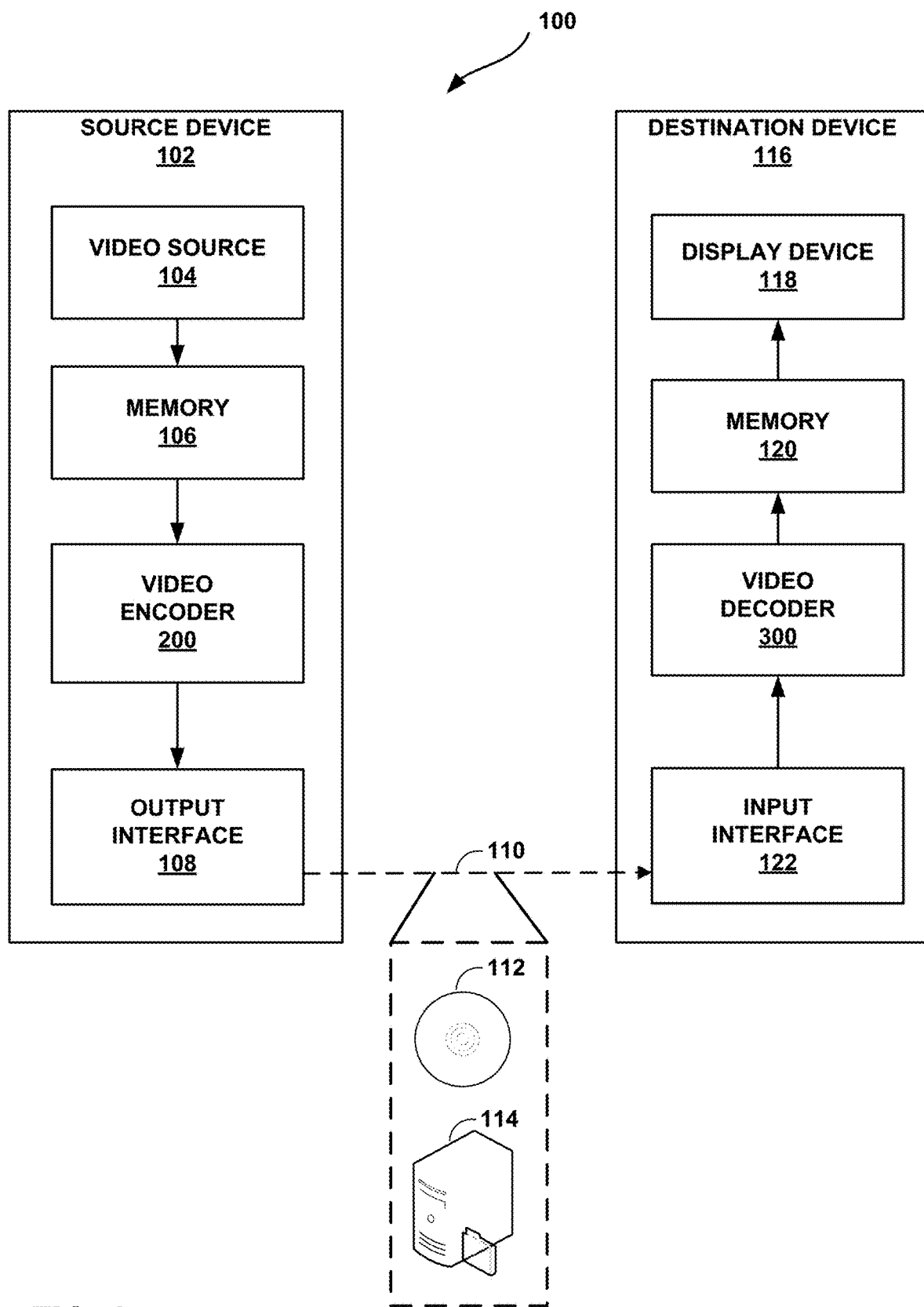
FIG. 1 is a block diagram illustrating an example video encoding and decoding system that may perform the techniques of this disclosure.

In video coding, a video coder determines a prediction block for a current block. The video coder may determine the prediction block using a motion vector or block vector for the current block or based on an intra-mode for the current block. From the prediction block, the video coder may determine a prediction signal used to encode or decode the current block.

Multiple hypothesis prediction (MHP) process is a video coding tool to determine the prediction signal for the current block based on the prediction block, which provides a base prediction signal, and one or more additional prediction signals, referred to as one or more prediction hypotheses. In the MHP process, the video coder applies weights to the base prediction signal and/or the one or more prediction hypotheses to determine the prediction signal for the current block.

A video encoder and a video decoder may each determine the prediction signal for the current block using the same techniques. A video encoder may determine residual values based on a difference between the prediction signal and the current block, and signal information indicative of the residual values. A video decoder may receive information indicative of the residual values, and reconstruct the current block based on the residual values and the prediction signal (e.g., add the residual values to the prediction signal).

In some techniques, the video encoder may signal to the video decoder information indicative of the weights that are applied for the MHP process. Such signaling may require additional signaling overhead and bandwidth utilization.

This disclosure describes examples techniques of utilizing template matching (TM) in the MHP process. By using the TM, in some examples, a video decoder may determine the weight for the MHP process without the video encoder signaling information indicating which weight to use. In some examples, by using the TM, a video encoder and a video decoder may construct a list such that weights having a higher probability of being applied are located at lower index values compared to weights having a lower probability of being applied. The amount of information needed to signal a lower index value is less than the amount of information needed to signal a higher index value. By constructing the list using TM, there is a higher probability that the amount of information that needs to be signaled to indicate the weight being applied is reduced as compared to constructing the list for the MHP process without using TM.

In this way, the example techniques may promote efficient bandwidth utilization, and improve the overall video coding process, such as the video coding using the MHP process. Moreover, the example techniques may also apply the MHP process where the one or more prediction hypotheses are derived from a merge list or an advanced motion vector predictor (AMVP) list.

For example, a video coder (e.g., video encoder or video decoder) may determine, for a multiple hypothesis prediction (MHP) process, a plurality of prediction templates based on a plurality of weights. As one example, the video coder may determine a reference template (e.g., a template identified from an initial vector for a current block) and may determine a hypothesis template (e.g., a template identified from a vector used to identify a prediction hypothesis). The reference template may be referred to as $T_{ref}$ and the hypothesis template may be referred to as $T_{add}$.

The video coder may determine a first prediction template by applying weights to the reference template and the hypothesis template based on a first weight of the plurality of weights, and determine a second prediction template by applying weights to the reference template and the hypothesis template based on a second weight of the plurality of weights. For example, the first prediction template, called $T_{pred1}$, may be equal to $(1-\alpha_1)T_{ref}+\alpha_1 T_{add}$, where $\alpha_1$ is the first weight. The second prediction template, called $T_{pred2}$, may be equal to $(1-\alpha_2)T_{ref}+\alpha_2 T_{add}$, where $\alpha_2$ is the second weight.

The video coder may repeat such techniques for each of the plurality of weights (e.g., $\alpha_3$, $\alpha_4$, and so forth). In some examples, the video encoder may signal and the video decoder may receive information that identifies a specific hypothesis template (e.g., $T_{add}$), and the video coder may repeat such technique for each of the plurality of weights for the specific hypothesis template.

However, in some examples, rather than there being one $T_{add}$, the video coder may determine a $T_{add}$ for each of a plurality of hypothesis templates (e.g., $T_{add1}$, $T_{add2}$, and so forth). The video coder may repeat the above example techniques for each of a plurality of hypothesis templates to determine the plurality of prediction templates. That is, the video coder may cycle through all weights of the plurality of weights for a first hypothesis template. The video coder may repeat these techniques for all hypothesis template.

For example, the video coder may determine a first set of $T_{pred}$ based on each weight of the plurality of weights applied to $T_{add1}$. The video coder may determine a second set of $T_{pred}$ based on each weight of the plurality of weights applied to $T_{add2}$, and so forth.

In the examples above, the video coder may have determined a plurality of prediction templates. The video coder may compare the plurality of prediction templates to a current template of a current block. For instance, to compare, the video coder may determine a template matching cost of each of the prediction templates (e.g., a sum of absolute difference (SAD) value or a value using some other technique between the current template and each of the prediction template).

In one or more examples, the video coder may determine the weight from the plurality of weights that resulted in the lowest template matching cost, and use that weight for fusing prediction hypotheses to generate the prediction signal. For instance, in examples where the video encoder signals and the video decoder receives information for a specific hypothesis template (e.g., $T_{add}$), the video coder may use the example techniques to determine which weight resulted in the lowest template matching cost. In examples where the video encoder does not signal information a specific hypothesis template, the video coder may use the example techniques across multiple hypothesis templates to both determine the weight and which prediction hypotheses should be used for generating the prediction signal.

In some examples, the video coder may order a list based on the template matching costs. Prediction templates or their associate prediction hypothesis having a lower temporal matching cost are identified at lower indices in the list compared to prediction templates or their associated prediction hypothesis having higher temporal matching costs. The video encoder may signal and the video decoder may receive an index into the list, and the video decoder may determine the weight or possibly the weight and the prediction hypothesis that should be used for generating the prediction signal.

The example techniques described in this disclosure can be applied as extensions to any of the existing video codecs, such as HEVC (High Efficiency Video Coding), VVC (Versatile Video Coding), Essential Video Coding (EVC) or be an efficient coding tool in future video coding standards (e.g., ECM (Enhanced Compression Model)).

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for utilizing template matching (TM) in the multiple hypothesis prediction (MHP) process. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for utilizing TM in the MHP process. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, ILBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, TrueAudio (TTA), TwinVQ, USAC, Vorbis (Ogg), WavPack, and Windows Media Aud.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use the MHP process. For instance, this disclosure describes examples of using TM as part of the MHP process, which may improve the MHP process.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, video encoder 200 and video decoder 300 may be configured to perform the MHP process with TM. The following describes MHP in further detail.

Multiple Hypothesis Prediction (MHP)

In example video coding standards, temporally predicted blocks may employ either uni or bi prediction. The multiple hypothesis prediction (MHP) was proposed in JVET-J0041, entitled "Multi-Hypothesis Inter Prediction," by Winken et al., and later on in JVET-K0269, entitled "CE 10: Multi-hypothesis inter prediction (Tests 1.5-1.8)," by Winken at al., JVET-L0148, entitled "CE 10: Multi-hypothesis inter prediction (Tests 1.2.a-1.2.c)," by Winken et al., and JVET-M0425, entitled "CE 10: Multi-hypothesis inter prediction (Test 10.1.2)," by Winken et al. In MHP, an inter prediction method allows weighted superposition of more than two motion-compensated prediction signals. The resulting overall prediction signal is obtained by sample-wise weighted superposition. With the uni/bi prediction signal $p_{uni/bi}$ (referred to as base prediction signal) and the first additional inter prediction signal/hypothesis $h_3$, the resulting prediction signal $p_3$ is obtained as follows:

$$p_3 = (1 - \alpha)p_{uni/bi} + \alpha h_3$$

The weighting factor α is specified by the syntax element add_hyp_weight_idx, according to the following mapping:

| add_hyp_weight_idx | α |
|---|---|
| 0 | ¼ |
| 1 | −⅛ |

In some examples, more than one additional prediction signal can be used. The resulting overall prediction signal is accumulated iteratively with each additional prediction signal.

$$p_{n+1} = (1 - \alpha_{n+1})p_n + \alpha_{n+1}h_{n+1}$$

The resulting overall prediction signal may be obtained as the last $p_n$ (i.e., the $p_n$ having the largest index n). For inter prediction blocks using MERGE mode (but in some cases not SKIP mode), additional inter prediction signals can also be specified. For the additional prediction signals, one of the two AMVP candidate lists is used:
  a. If the POC of the reference picture of the additional prediction signal equals the POC of the used list1 reference picture (e.g., second reference picture list), the list1 AMVP candidate list is used.
  b. Otherwise, the list0 (e.g., first reference picture list) AMVP candidate list is used.

The motion parameters of each additional prediction hypothesis can be signaled either explicitly by specifying the reference index, the motion vector predictor index, and the motion vector difference, or implicitly by specifying a merge index. A separate multi-hypothesis merge flag distinguishes between these two signaling modes. In ECM (enhanced compression model), the number of additional hypothesis prediction signals is set to 2.

Stated another way, video encoder 200 and video decoder 300 may determine a base prediction signal, where the base prediction signal is based on a motion vector, block vector, or intra-prediction mode. Video encoder 200 and video decoder 300 may also determine one or more prediction hypotheses. The prediction hypotheses may be additional prediction signals. As one example, video encoder 200 and video decoder 300 may determine a motion vector for each of the entries in a merge list or an AMVP list. Video encoder 200 and video decoder 300 may determine to which blocks the motion vectors in the merge list or the AMVP list point, and determine the prediction hypotheses (e.g., additional prediction signals) based on the blocks to which the motion vectors in the merge list or the AMVP list point. The above is one example way in which to determine the one or more prediction hypotheses, and there may be other techniques as well.

With the base prediction signal and the one or more additional prediction signals (e.g., from the prediction hypotheses), video encoder 200 and video decoder 300 may generate the prediction signal for the current block using the above equation for $p_n+1$, as an example. In some examples, video encoder 200 may signal and video decoder 300 may receive the add_hyp_weight_idx syntax element to determine the value of α (e.g., a weight parameter). In some examples, video encoder 200 may signal and video decoder 300 may receive information that identifies which prediction hypotheses to use. For example, video encoder 200 may signal and video decoder 300 may receive an index into the merge list or AMVP list, and use that information to determine the prediction hypotheses to use.

For video encoder 200 to signal and video decoder 300 to parse the add_hyp_weight_idx syntax element requires signaling bandwidth and overhead. As described in more detail, this disclosure describes example techniques using template matching to determine the weight applied to the one or more prediction hypotheses (e.g., the additional prediction signals) that may reduce the signaling bandwidth and overhead. Furthermore, in some examples, using template matching, it may be possible for video decoder 300 to determine which prediction hypotheses to use without signaling from video encoder 200 or signaling in a manner that utilizes less bandwidth, which further improves bandwidth utilization.

Template Matching Prediction

Template matching (TM) prediction is a special merge mode based on Frame-Rate Up Conversion (FRUC) techniques. With this mode, motion information of a block is not signalled but derived at decoder side by video decoder 300. TM prediction is applied to both AMVP (advanced motion vector predictor) mode and regular merge mode. In AMVP mode, MVP (motion vector predictor) candidate selection is determined based on template matching to pick up the one which reaches the minimal difference between current block template and reference block template. In regular merge mode, a TM mode flag is signaled to indicate the use of TM and then TM is applied to the merge candidate indicated by merge index for MV refinement.

Figure 6:
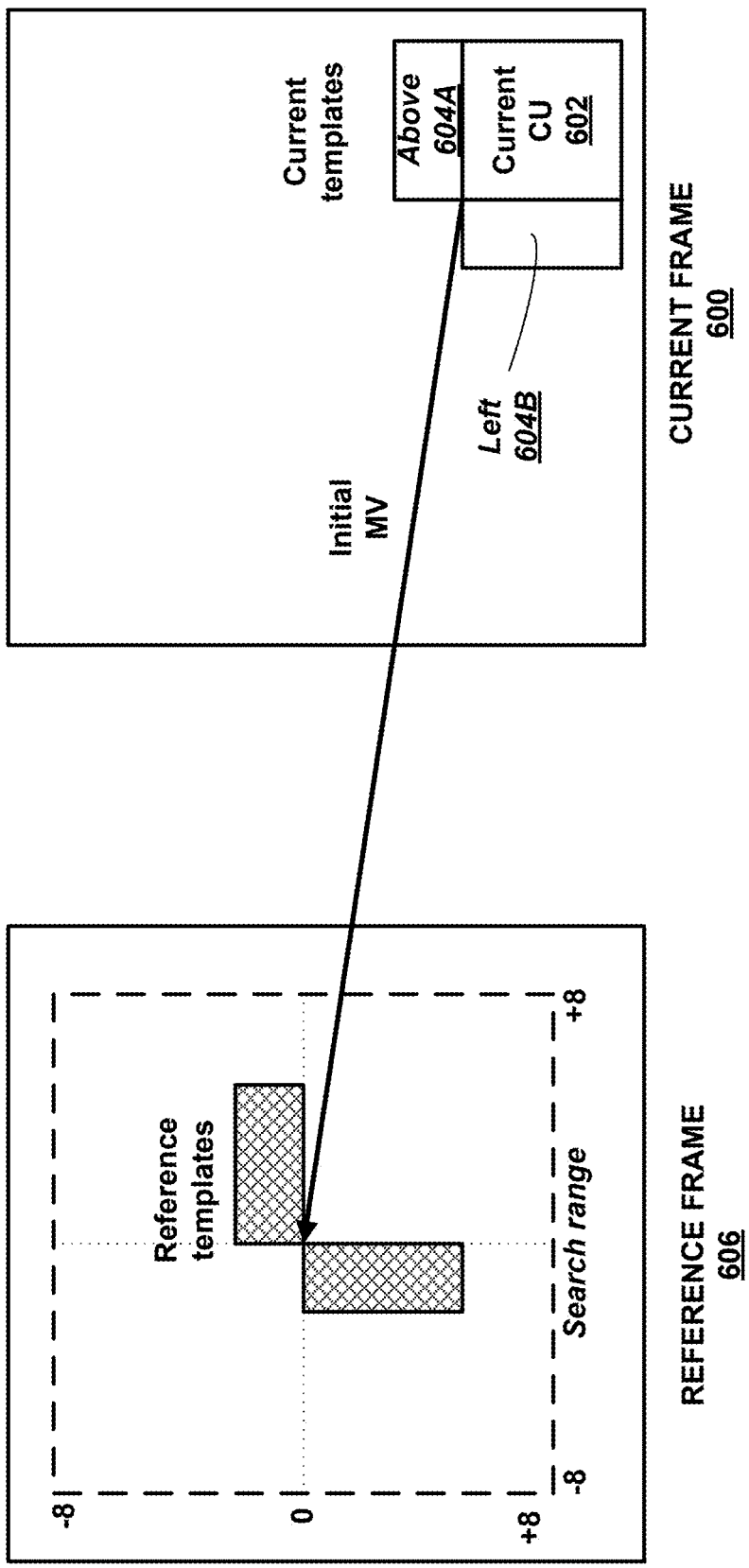
FIG. 6 is a conceptual diagram illustrating an example of template matching on a search area around an initial motion vector (MV).

As shown in FIG. 6, template matching is used to derive motion information of the current CU by finding the closest match between a template (top and/or left neighbouring blocks of the current CU) in the current picture and a block (same size to the template) in a reference picture. For example, FIG. 6 illustrates current frame 600 (e.g., current picture) having current CU 602 with current template 604 that includes above template 604A and left template 604B. Reference frame 606 (e.g., reference picture) includes reference templates as illustrated.

With an AMVP candidate selected based on initial matching error, the MVP of the AMVP candidate is refined by template matching. With a merge candidate indicated by signaled merge index, the merged MVs of the merge candidate corresponding to L0 (first reference picture list) and L1 (second reference picture list) are refined independently by template matching and then the less accurate one is further refined again with the better one as a prior.

For the cost function, when a motion vector points to a fractional sample position, motion compensated interpolation is needed. To reduce complexity, bi-linear interpolation instead of regular 8-tap DCT-IF interpolation is used for both template matching to generate templates on reference pictures. The matching cost C of template matching is calculated as follows:

$$C = SAD + w \cdot (|MV_x - MV_x^s| + |MV_y - MV_y^s|).$$

In the above, w is a weighting factor which is empirically set to 4, MV and MVS indicate the currently testing MV and the initial MV (i.e., a MVP candidate in AMVP mode or merged motion in merge mode) respectively. SAD is used as the matching cost of template matching.

When TM is used, motion may be refined by using luma samples only. The derived motion may be used for both luma and chroma for MC inter prediction. After MV is decided, final MC is performed using 8-taps interpolation filter for luma and 4-taps interpolation filter for chroma.

For the search method, MV refinement is a pattern-based MV search with the criterion of template matching cost and a hierarchical structure. Two search patterns may be supported-a diamond search and a cross search for MV refinement. The hierarchical structure specifies an iterative process to refine MV, starting at a coarse MVD precision (e.g., quarter-pel) and ending at a fine one (e.g., ⅛-pel). The MV is directly searched at quarter luma sample MVD precision with diamond pattern, followed by quarter luma sample MVD precision with cross pattern, and then this is followed by one-eighth luma sample MVD refinement with cross pattern. The search range of MV refinement is set equal to (−8, +8) luma samples around the initial MV. When the current block is of bi-prediction, both MVs are refined independently, and then the best of which (in terms of matching cost) is set as a prior to further refine the other MV with BCW weight values.

Adaptive Reordering of Merge Candidates (ARMC)

In ECM, the merge candidates are adaptively reordered with template matching (TM). The reordering method is applied to regular merge candidate list, TM merge candidate list, and affine merge candidate list (subblock merge candidate list excluding the SbTMVP candidate). For the TM merge mode, merge candidates are reordered before the TM refinement process.

After a merge candidate list is constructed, merge candidates are divided into several subgroups. The subgroup size is set to 5 for regular merge mode and TM merge mode. The subgroup size is set to 3 for affine merge mode. Merge candidates in each subgroup are reordered ascendingly according to cost values based on TM. For simplification, merge candidates in the last but not the first subgroup are not reordered.

The TM cost of a merge candidate is measured by the sum of absolute differences (SAD) between samples of a template of the current block and their corresponding reference samples. The template comprises a set of reconstructed samples neighboring to the current block. Reference samples of the template are located by the motion information of the merge candidate.

Figure 7:
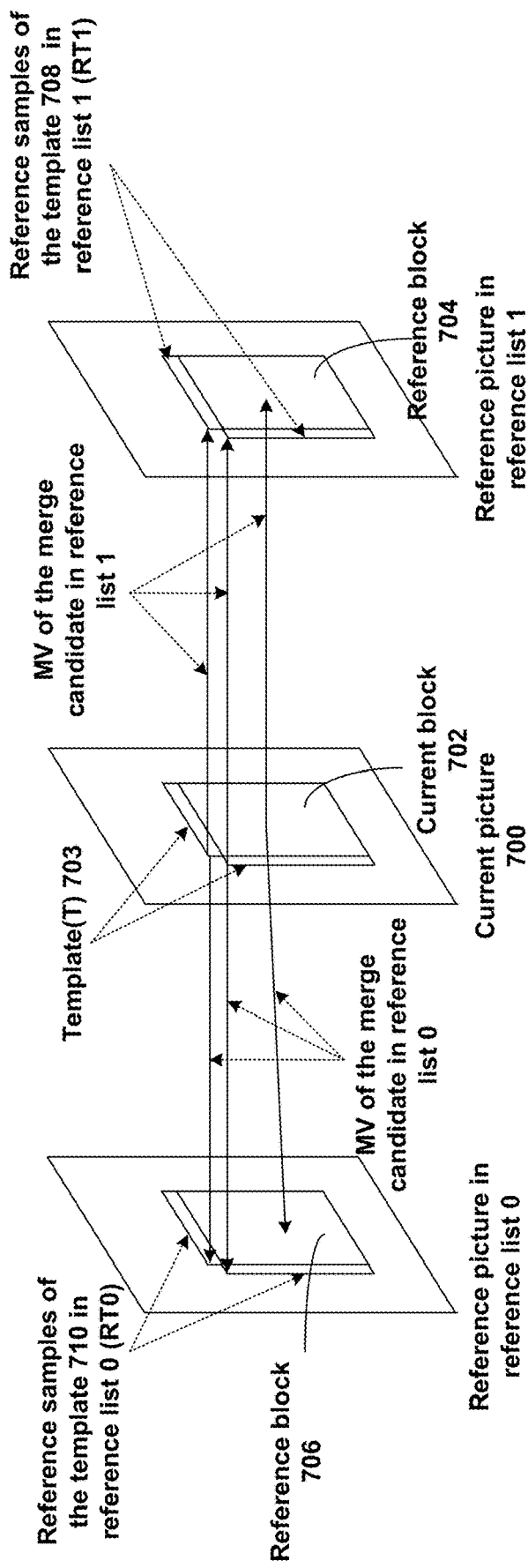
FIG. 7 is a conceptual diagram illustrating an example of template and reference samples of a template in reference pictures.

When a merge candidate utilizes bi-directional prediction, the reference samples of the template of the merge candidate are also generated by bi-prediction as shown in FIG. 7. For instance, FIG. 7 illustrates current picture 700 that includes current block 702 having template 703. Reference block 704 is in a reference picture in reference picture list 1 with reference template 708. Reference block 706 is in a reference picture in reference picture list 0 with reference template 710.

Figure 8:
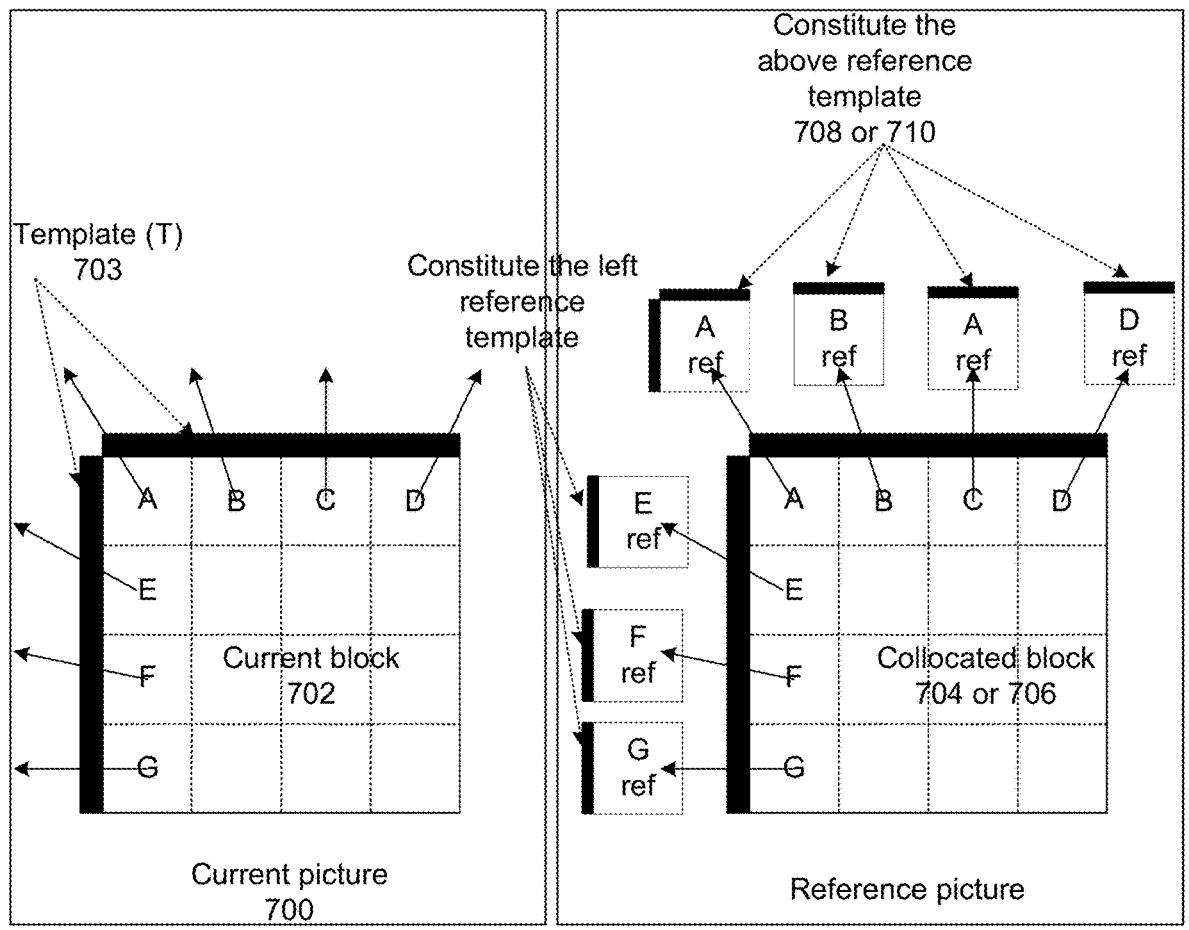
FIG. 8 is a conceptual diagram illustrating an example of template and reference samples for the template for block with sub-block motion using motion information of the sub-blocks of the current block.

For subblock-based merge candidates with subblock size equal to WsubxHsub, the above template comprises of several sub-templates with the size of Wsubx1, and the left template comprises several sub-templates with the size of 1xHsub. As shown in FIG. 8, the motion information of the subblocks in the first row and the first column of current block is used to derive the reference samples of each sub-template. FIG. 8 uses the same reference numerals as FIG. 7 for case.

Merge Mode with MVD (MMVD)

In VVC and ECM, in addition to merge mode, where the implicitly derived motion information is directly used for prediction samples generation of the current CU, the merge mode with motion vector differences (MMVD) is introduced. A MMVD flag may be signaled right after sending a regular merge flag to specify whether MMVD mode is used for a CU.

In MMVD, after a merge candidate is selected, the merge candidate may be further refined by the signaled MVDs information. The further information includes a merge candidate flag, an index to specify motion magnitude, and an index for indication of motion direction. In MMVD mode, one for the first two candidates in the merge list is selected to be used as MV basis. The MMVD candidate flag may be signaled to specify which one is used between the first and second merge candidates.

Figure 9B:
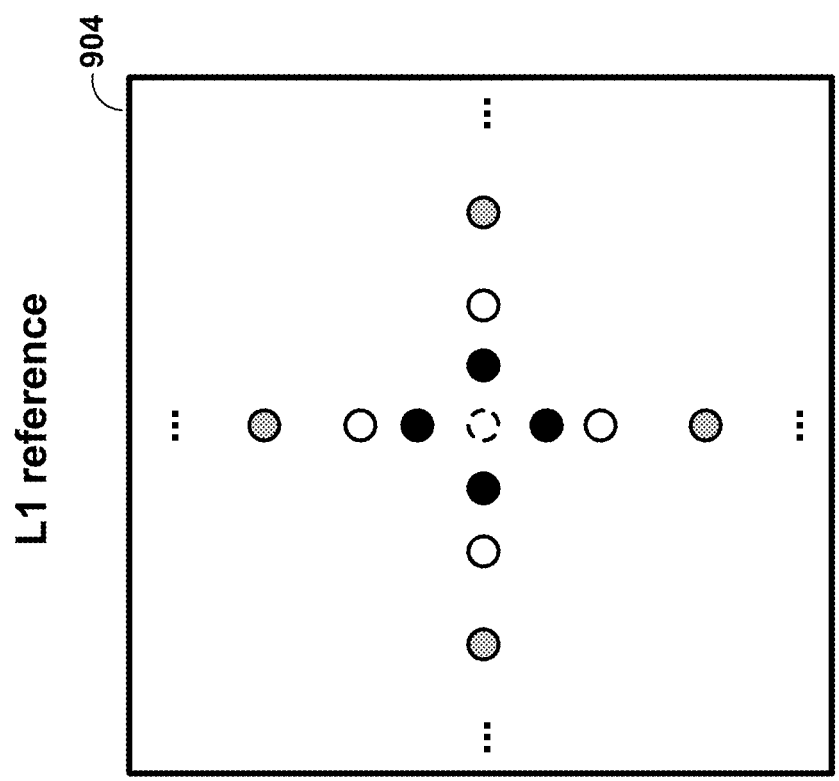
FIGS. 9A and 9B are conceptual diagrams illustrating example of merge mode with motion vector difference (MMVD) search point for a first reference picture list and a second reference picture list, respectively.
Figure 9A:
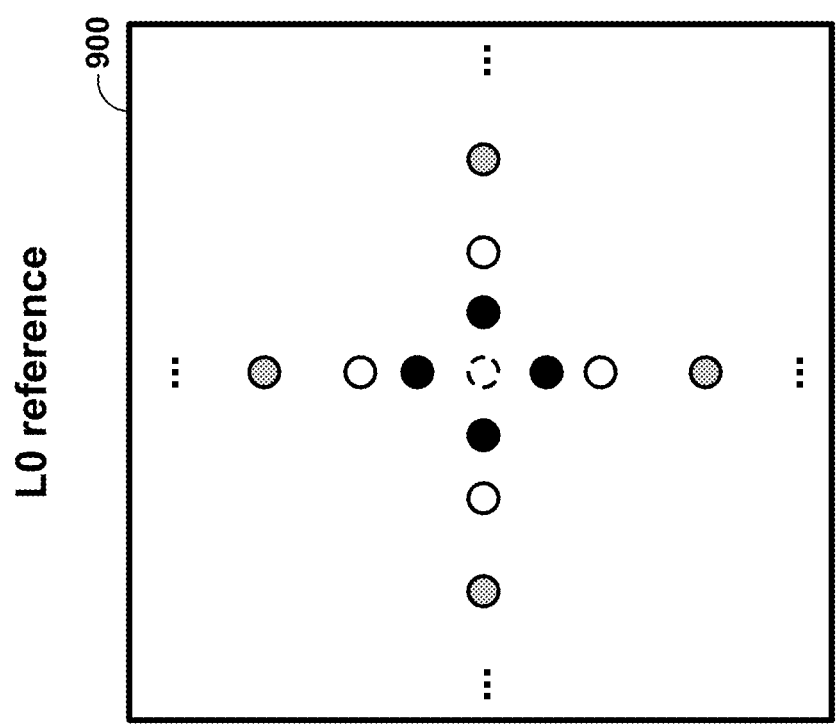

Distance index specifies motion magnitude information and indicate the pre-defined offset from the starting point. As shown in FIGS. 9A and 9B, an offset is added to either horizontal component or vertical component of starting MV. The relation of distance index and pre-defined offset is specified in Table 1.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

Direction index represents the direction of the MVD relative to the starting point. The direction index can represent of the four directions as shown in Table 2. The meaning of MVD sign may be variant according to the information of starting MVs. When the starting MVs is a uni-prediction MV or bi-prediction MVs with both lists pointing to the same side of the current picture (i.e., POCs of two references are both larger than the POC of the current picture, or are both smaller than the POC of the current picture), the sign in Table 2 specifies the sign of MV offset added to the starting MV. When the starting MVs is bi-prediction MVs with the two MVs point to the different sides of the current picture (i.e., the POC of one reference is larger than the POC of the current picture, and the POC of the other reference is smaller than the POC of the current picture), and the difference of POC in list 0 (first reference picture list) is greater than the one in list 1, the sign in Table 2 specifies the sign of MV offset added to the list 0 MV component of starting MV and the sign for the list 1 MV has opposite value. Otherwise, if the difference of POC in list 1 (second reference picture list) is greater than list 0, the sign in Table 2 specifies the sign of MV offset added to the list 1 MV component of starting MV and the sign for the list 0 MV has opposite value.

The MVD is scaled according to the difference of POCs in each direction. If the differences of POCs in both lists are the same, no scaling is needed. Otherwise, if the difference of POC in list 0 is larger than the one of list 1, the MVD for list 1 is scaled, by defining the POC difference of L0 as td and POC difference of L1 as tb. If the POC difference of L1 is greater than L0, the MVD for list 0 is scaled in the same way. If the starting MV is uni-predicted, the MVD is added to the available MV.

TABLE 2

| Sign of MV offset specified by direction index | | | | |
|---|---|---|---|---|
| Direction IDX | 00 | 01 | 10 | 11 |
| x-axis | + | − | N/A | N/A |
| y-axis | N/A | N/A | + | − |

Currently in ECM, the weight index for multiple hypothesis prediction (MHP) is signaled no matter whether the MHP predictor is derived from merge list or AMVP list. In accordance with one or more examples described in this disclosure, template matching techniques may be used with MHP. That is, video encoder 200 and video decoder 300 may apply the template matching technique to MHP to provide additional information to further improve the coding performance of the MHP coding tool.

For instance, template matching cost may be an effective measure in describing how similar the predictor (e.g., prediction block) is when compared to the current block. The template of current block and the reference block is defined as described with respect to Template Matching Prediction above, and FIG. 6. In some examples, the sum of absolute difference (SAD) value is computed and used as the template matching cost between the current and reference template.

For template matching based MHP weight selection for hypothesis derived from merge list, as described above for Multiple Hypothesis Prediction (MHP), the additional hypothesis in MHP can be derived from either merge list or AMVP list. When the additional hypothesis is derived from the merge list, the MHP weight can be selected based on the template matching cost and hence save the signaling overhead for the MHP weight index. Given the template of current block, reference block, and the template of the additional hypothesis predictor defined as $T_{cur}$, $T_{ref}$ and $T_{add}$, the template of the overall prediction is defined as $$T_{pred} = (1 - \alpha)T_{ref} + \alpha T_{add}$$

In the above, α is the current weight that is being examined. The template matching cost between $T_{cur}$ and $T_{pred}$ is generated by computing the SAD of the two templates. For a total number of n possible weight, n TM costs can be derived denoted as $Cost_n$. In one example, the MHP weight is selected to be the weight that corresponds to the minimum TM cost among all $Cost_n$. In some examples, only the first m weight indices are kept, with m<n, and then signaled. In this way, the signaling overhead for the MHP weight index can be reduced.

For example, video encoder 200 and video decoder 300 may determine a reference block (e.g., based on a motion vector for a current block). Video encoder 200 and video decoder 300 may determine reference template for the reference block. The reference template is referred to as $T_{ref}$ above. The reference template may include samples that neighbor the reference block.

Video encoder 200 and video decoder 300 may also determine one or more prediction hypotheses. As one example, video encoder 200 may signal and video decoder 300 may receive information identifying the prediction hypotheses, such as based on an index into merge list or AMVP list. As another example, video encoder 200 and video decoder 300 may select a first N entries in the merge list or the AMVP list. There may be other ways in which to determine the prediction hypotheses, such as with MMVD extension, ARMC, and reordering, described in more detail below.

For each of the prediction hypotheses, video encoder 200 and video decoder 300 may determine a respective hypothesis template. For example, for a prediction hypothesis, the hypothesis template for that prediction hypothesis may be samples that neighbor the prediction hypothesis. The hypothesis template is referred to as $T_{add}$ above. There may be a plurality of hypothesis templates (e.g., plurality of $T_{add}$), with one hypothesis template for each of the one or more prediction hypotheses.

Using the above equation, video encoder 200 and video decoder 300 may determine a prediction template, referred to as $T_{pred}$ above, based on a current weight being evaluated. Video encoder 200 and video decoder 300 may cycle through each weight of a plurality of weights and determine respective prediction templates. That is, video encoder 200 and video decoder 300 may determine, for a multiple hypothesis prediction (MHP) process, a plurality of prediction templates based on a plurality of weights.

For example, video encoder 200 and video decoder 300 may determine a first prediction template based on a reference template, a hypothesis template, and a first weight of the plurality of weights, and determine a second prediction template based on the reference template, the hypothesis template, and a second weight of the plurality of weights. As an example, to determine the first prediction template, video encoder 200 and video decoder 300 may determine $T_{pred1} = (1-\alpha_1)T_{ref} + \alpha_1 T_{add}$, where $T_{pred1}$ is the first prediction template, $\alpha_1$ is the first weight (e.g., ¼ or −⅛), $T_{ref}$ is the reference template, and $T_{add}$ is the hypothesis template. To determine the second prediction template, video encoder 200 and video decoder 300 may determine $T_{pred2} = (1-\alpha_2)T_{ref} + \alpha_2 T_{add}$, wherein $T_{pred2}$ is the second prediction template, $\alpha_2$ is the second weight (e.g., the other of ¼ or −⅛), $T_{ref}$ is the reference template, and $T_{add}$ is the hypothesis template.

Video encoder 200 and video decoder 300 may repeat this process for N number of weights. For instance, in the example above, there are two weights $\alpha_1$ and $\alpha_2$ (e.g., one is ¼ and the other is −⅛). However, there may be more than two weights (e.g., N weights), and video encoder 200 and video decoder 300 may repeat the above example techniques to generate N $T_{pred}$ (i.e., $T_{pred1}$ to $T_{predN}$).

In the above example, video encoder 200 may have signaled information that identifies the one or more prediction hypotheses. However, in some examples, video encoder 200 may not signal such information. In such examples, video encoder 200 and video decoder 300 may test different prediction hypotheses, including different hypothesis templates.

For example, assume that there are M prediction hypotheses candidates. Video encoder 200 and video decoder 300 may determine $T_{pred1}$ to $T_{predN}$ for a first prediction hypotheses candidate. For instance, video encoder 200 and video decoder 300 may determine a first hypothesis template ($T_{add1}$) for a first prediction hypotheses candidate (e.g., first entry in the merge or AMVP list). Video encoder 200 and video decoder 300 may determine $T_{pred1}$ to $T_{predN}$ using $T_{add1}$. Video encoder 200 and video decoder 300 may determine a second hypothesis template ($T_{add2}$) for a second prediction hypotheses candidate (e.g., second entry in the merge or AMVP list). Video encoder 200 and video decoder 300 may determine $T_{pred1}$ to $T_{predN}$ using $T_{add2}$. Video encoder 200 and video decoder 300 may repeat these operations for all M prediction hypotheses candidates. In this example, video encoder 200 and video decoder may generate N*M number of $T_{pred}$.

Accordingly, in some examples, the hypothesis template (e.g., $T_{add}$) is a first hypothesis template (e.g., $T_{add1}$). Video encoder 200 and video decoder 300 may determine a third prediction template (e.g., $T_{pred3}$) based on the reference template (e.g., $T_{ref}$), a second hypothesis template (e.g., $T_{add2}$), and the first weight (e.g., $\alpha_1$) of the plurality of weights. Video encoder 200 and video decoder 300 may determine a fourth prediction template (e.g., $T_{pred4}$) based on the reference template (e.g., $T_{ref}$), the second hypothesis template (e.g., $T_{add2}$), and the second weight (e.g., $\alpha_2$) of the plurality of weights. Video encoder 200 and video decoder 300 may repeat these steps for all M options for $T_{add}$.

Furthermore, the above example equation for $T_{pred}$ includes only one $T_{add}$. However, in other examples, there may be more than one $T_{add}$, such as in examples where the prediction signal is generated using a plurality of additional prediction signals (e.g., using a plurality of prediction hypotheses). Simply for ease of description, the examples are described with respect to have one prediction hypothesis that is used for generating the prediction signal.

Video encoder 200 and video decoder 300 may compare the plurality of prediction templates (e.g., $T_{pred1}$ to $T_{pred}$, and possibly for all $T_{add1}$ to $T_{addM}$) to a current template of a current block. The current template for the current block may include samples that neighbor the current block. As one example, video encoder 200 and video decoder 300 may determine a template matching cost of each $T_{pred}$. One example way to determine the template matching cost is based on a sum of absolute differences (SAD) between each of the $T_{pred}$ and the current template to compare each of the plurality of prediction templates to the current template.

In one or more examples, video encoder 200 and video decoder 300 may determine a weight from the plurality of weights based on the comparing of the plurality of prediction templates to the current template of the current block. As one example, video encoder 200 and video decoder 300 may determine which one of the plurality of prediction templates has the minimal difference with the current template, and determine the weight based on the prediction template that has the minimal difference with the current template. For example, assume that the SAD between $T_{pred2}$ and the current template is the least difference, and $T_{pred2}$ is determined based on $\alpha_2$. In this example, video encoder 200 and video decoder 300 may determine that the weight applied for MHP process is $\alpha_2$. In this manner, video encoder 200 may not need to signal and video decoder 300 may not need to receive a syntax element indicating the weight.

As another example, video encoder 200 and video decoder 300 may construct a list based on the comparing of the plurality of prediction templates to the current template of the current block. For example, video encoder 200 and video decoder 300 may order the weights and/or prediction hypotheses based on the template matching costs. Video encoder 200 and video decoder 300 may include weights and/or prediction hypotheses having lower template matching costs at lower index entries in the list, and include weights and/or prediction hypotheses having lower template matching costs at higher index entries in the list.

Video decoder 300 may determine the weight and/or prediction hypotheses to use based on an entry in the list. For example, video encoder 200 may signal an index into the list, and video decoder 300 may use the index to determine the weight and/or prediction hypotheses to use. In this example, there may be signaling for an index into the list. However, the list is ordered based on which weight and/or prediction hypotheses is most likely to be selected. In general, signaling smaller values requires less bandwidth than larger values. Therefore, by ordering the list such that weights and/or prediction hypotheses are identified earlier in the list, there may be a reduction in bandwidth utilization since lower index values would be signaled.

Video encoder 200 and video decoder 300 may determine one or more prediction hypotheses. As an example, video encoder 200 may signal information (e.g., index into merge list) that video decoder 300 receives to determine the one or more prediction hypotheses. In this example, video encoder 200 and video decoder 300 may have determined the hypothesis template(s) (e.g., $T_{add}$) based on the prediction hypotheses that video encoder 200 indicated.

As another example, video encoder 200 and video decoder 300 may determine the one or more prediction hypotheses based on the comparing of the plurality of prediction templates to the current template of the current block. For example, video encoder 200 and video decoder 300 may cycle through the weights and the prediction hypotheses to determine N*M number of $T_{pred}$, where N is the number of weights and M is the number of prediction hypotheses. Video encoder 200 and video decoder 300 may determine which combination of weights and hypothesis template resulted in the lowest template matching cost, and select that weight and prediction hypothesis or hypotheses as the weight and the one or more prediction hypotheses to use for the MHP process. In this example, video encoder 200 may not need to signal and video decoder 300 may not need to receive information that indicates weight and/or prediction hypotheses, which may further reduce bandwidth utilization.

As yet another example, video encoder 200 may signal and video decoder 300 may receive an index into the list, as described above. Based on the index, video decoder 300 may determine both the weight and prediction hypothesis or hypotheses to use for the MHP process. In this example, signaling may be utilized, but since video encoder 200 is more likely to signal lower index values, there may be a reduction in bandwidth utilization since lower index values would be signaled.

Video encoder 200 and video decoder 300 may determine a prediction signal for the current block based on the one or more prediction hypotheses and the weight. To determine the prediction signal for the current block based on the one or more prediction hypotheses and the weight, video encoder 200 and video decoder 300 may apply the weight to at least one prediction hypothesis of the one or more prediction hypotheses, and combine a base prediction signal and the at least one prediction hypothesis having the weight applied to determine the prediction signal for the current block.

For example, video encoder 200 and video decoder 300 may determine $p_3=(1-\alpha)p_{uni/bi}+\alpha h_3$. In this example, the determined weight (e.g., $\alpha$) is applied to h3, which is a prediction hypothesis. For instance, as described above, $p_3$ is the prediction signal, $\alpha$ is the weight that is determined using above techniques of template matching (e.g., comparing the plurality of prediction templates to a current template of a current block), and $h_3$ is the prediction hypothesis (e.g., determined by video encoder 200 and signaled to video decoder 300 or determined using the template matching described above).

Video encoder 200 and video decoder 300 may perform similar techniques if there are more than one prediction hypothesis (e.g., where $p_{n+1}=(1-\alpha_{n+1})p_n+\alpha_{n+1}h_{n+1}$). For example, video encoder 200 and video decoder 300 may perform the above example techniques to determine respective weights for each of the plurality hypotheses.

Video encoder 200 and video decoder 300 may encode or decode the current block based on the prediction signal. For example, to decode the current block, video decoder 300 may determine residual values indicative of a difference between the prediction signal and the current block, and add the residual values to the prediction signal to reconstruct the current block. To encode the current block, video encoder 200 may determine residual values indicative of a difference between the prediction signal and the current block, and signal information indicative of the residual values.

The above described examples where the hypothesis templates may be based on prediction hypotheses determined from merge or AMVP lists. However, the examples are not so limited, and may be extended to other techniques for determining prediction hypotheses. For instance, in MMVD, there is a motion vector and a motion vector difference (MVD). In one or more examples, video encoder 200 and video decoder 300 may add different MVDs (e.g., either signaled or not) to a motion vector to determine additional prediction hypotheses, and therefore, additional hypothesis templates.

For instance, for template matching based MHP weight selection with MMVD extension on merge list, the source of additional hypotheses predictor can be originated from merge list. For merge candidate, MMVD technique can be used. As described above for Merge mode with MVD (MMVD), a motion vector offset is added to the original merge candidate and therefore a different additional hypothesis predictor can be generated. For each of the predictor, the corresponding template $T_{add}$ can be generated and based on the examples described for template matching based MHP weight selection for hypothesis derived from merge list, the template matching cost for each of the MMVD candidates can be computed. Video encoder 200 and video decoder 300 may derive the TM cost for all the possible MMVD offsets and all the possible MHP weight, and then sort the TM cost in ascending order, not only the best MHP weight may be decided but also the motion vector of the merge candidate may be refined.

In some examples, only the candidate with the minimum TM cost is selected and hence no signaling is needed for both MHP weight and MMVD information. In some examples, the first m candidates are kept, and a corresponding index is signaled. In some examples, the sorting is applied in subgroups with each of the MMVD offset as one group. In this way, only the MMVD information may be needed to be signaled and the MHP weight is still decided based on the TM cost. In some examples, the sub-group is divided based on the MHP weight, in this way, the signaling may be only necessary for the MHP weight but MMVD information can be omitted from signaling.

For template matching based MHP merge list with ARMC, in the above examples, TM cost based sorting is performed. However, the sorting may be only restricted to be within each of the merge candidates. In some examples, when the MHP is derived from merge list, not only the MHP weight but also the merge index may need to be signaled. In order to reduce the signaling overhead, ARMC may be applied to the merge list. Similar to example techniques described above, the best MHP weight can be decided based on the TM cost. Therefore, for each of the merge candidates, this TM cost can be used as the best TM cost for the specific merge candidates. Looping over all the merge candidates in the merge list, the best TM cost for each of the merge candidates can be determined. Then, the ARMC technique can be applied to shuffle the merge index. In this way, a good merge candidate with large merge index can end up with a much smaller merge index after ARMC.

In some examples, only the best merge candidates are selected and the merge index signaling is skipped. In some examples, only the top m candidates are kept, with m<n, and signaled. In some examples, all the candidates are kept and signaled.

For template matching based MHP weight reorder for hypothesis derived from AMVP list, when the additional hypothesis predictor is generated from the AMVP list, similar techniques as described above can be used in which an ARMC process is applied to reorder the MHP weight. For MHP from AMVP list, motion estimation process is applied with the consideration of MHP weight index. Therefore, the motion vectors are optimized for each of the weight. Accordingly, compared to MHP derived from merge list, each of the weight in MHP derived from AMVP list counts. Due to this, only the ARMC process may be applied based on the TM cost of each weight and a weight index after ARMC is signaled instead of the original index to save signaling overhead.

Figure 2:
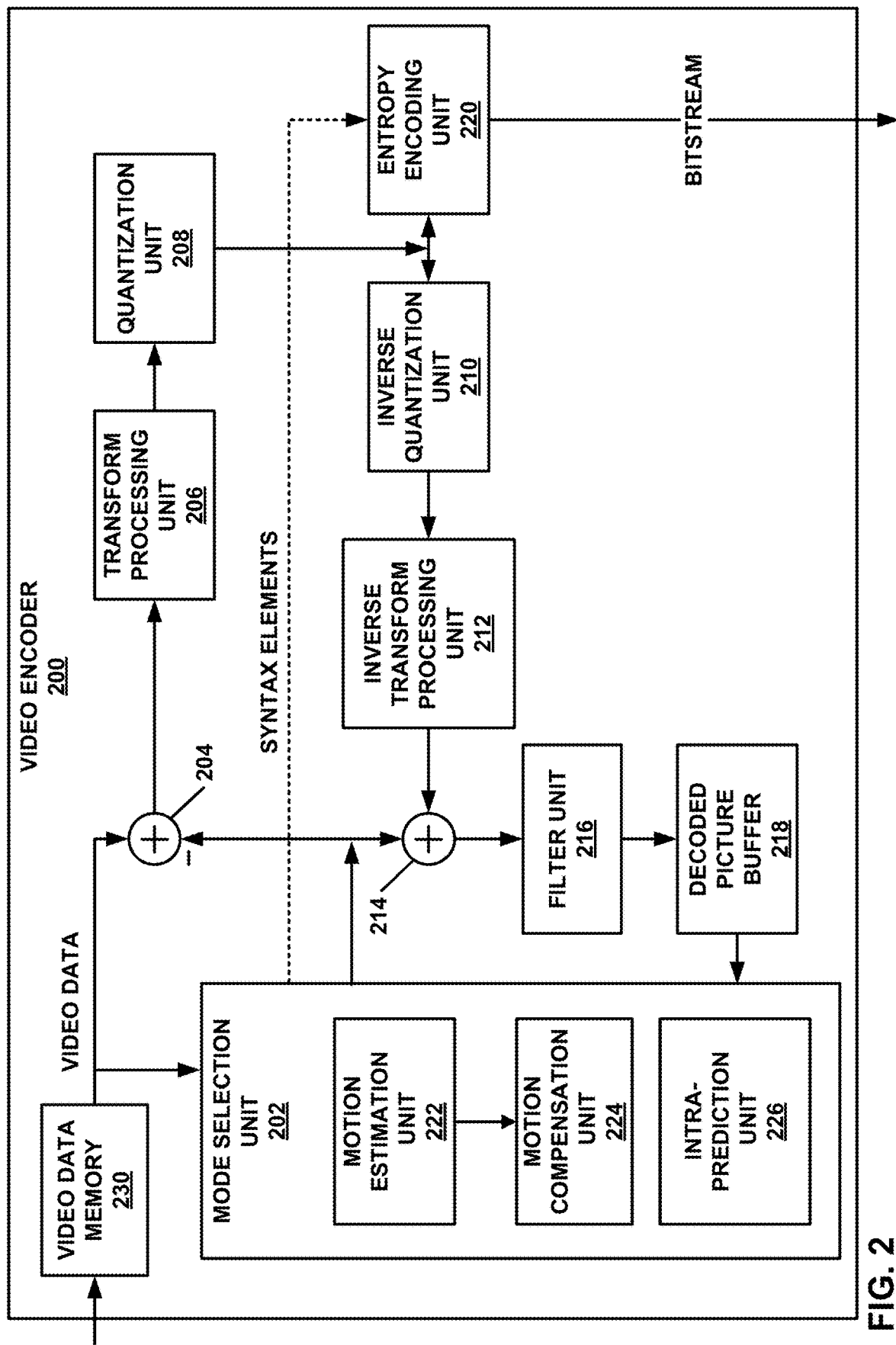
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a plurality of weights based on a current template for a current block and a reference template for a reference, determine a weight to apply for a multiple hypothesis prediction (MHP) process from the plurality of weights. The MHP process may include determining a prediction signal for the current block based on a prediction block, one or more prediction hypotheses, and the weight. Video encoder 200 may be configured to encode the current block based on the prediction signal.

As one example, video encoder 200 may determine, for a multiple hypothesis prediction (MHP) process, a plurality of prediction templates based on a plurality of weights, and compare the plurality of prediction templates to a current template of a current block. Video encoder 200 may determine a weight from the plurality of weights based on the comparing of the plurality of prediction templates to the current template of the current block. Video encoder 200 may determine one or more prediction hypotheses, and determine a prediction signal for the current block based on the one or more prediction hypotheses and the weight. Video encoder 200 may encode the current block based on the prediction signal.

For example, video encoder 200 may be configured to determine a plurality of template matching costs for each of the plurality of weights, and determine the weight that corresponds to the plurality of template matching costs having a minimum template matching cost. As another example, video encoder 200 may construct a list of weights based on the plurality of weights, and signal an index into the list of weights. Video encoder 200 may sort the list of weights (e.g., the weights of the plurality of weights) based on the plurality of template matching costs, and signal the index in the sorted list.

Video encoder 200 may be configured to determine residual values indicative of a difference between the current block and the prediction signal. Video encoder 200 may signal information indicative of the residual values.

Figure 3:
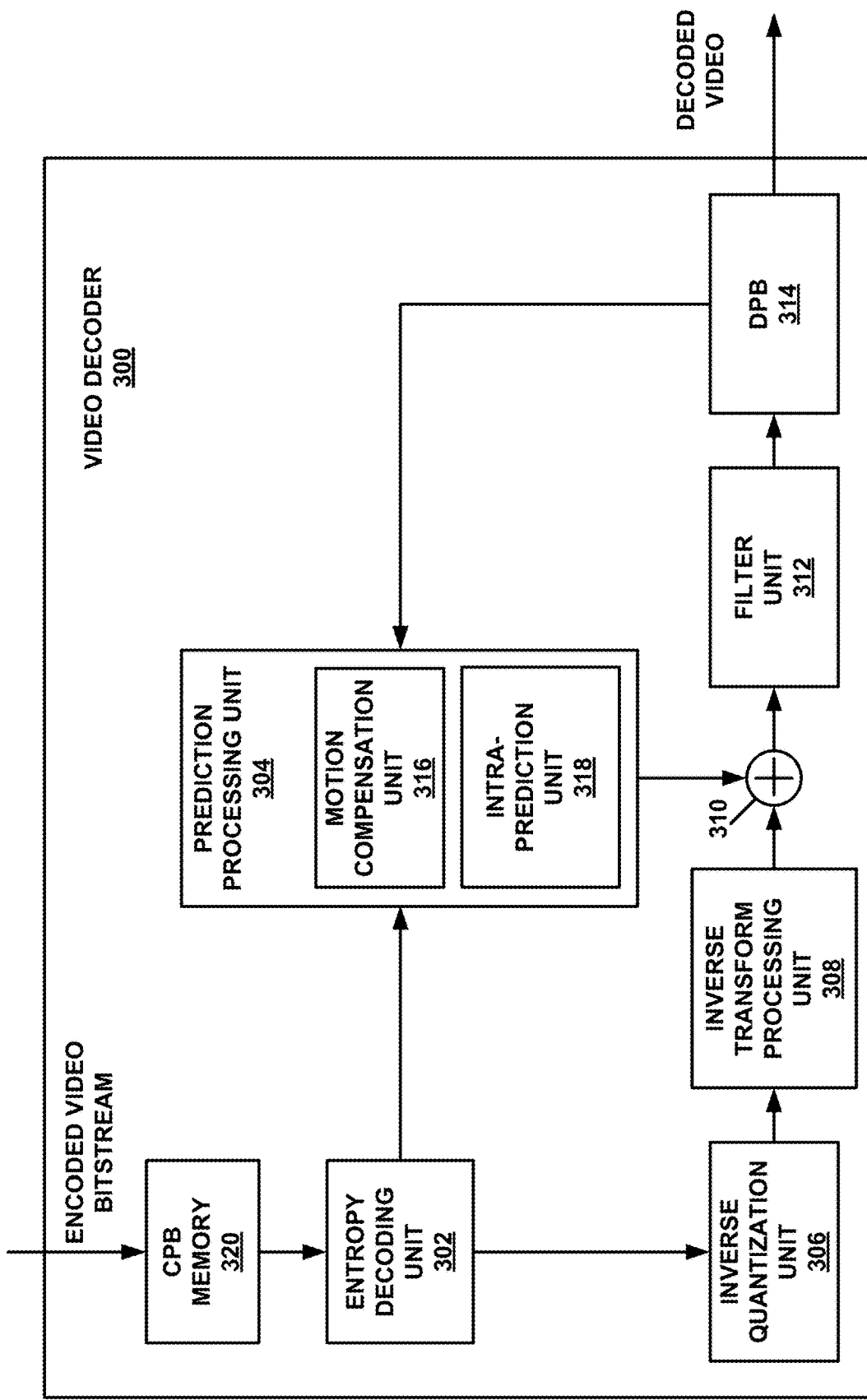
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine a plurality of weights based on a current template for a current block and a reference template for a reference, determine a weight to apply for a multiple hypothesis prediction (MHP) process from the plurality of weights. The MHP process may include determining a prediction signal for the current block based on a prediction block, one or more prediction hypotheses, and the weight. Video decoder 300 may be configured to decode the current block based on the prediction signal.

As one example, video decoder 300 may determine, for a multiple hypothesis prediction (MHP) process, a plurality of prediction templates based on a plurality of weights, and compare the plurality of prediction templates to a current template of a current block. Video decoder 300 may determine a weight from the plurality of weights based on the comparing of the plurality of prediction templates to the current template of the current block. Video decoder 300 may determine one or more prediction hypotheses, and determine a prediction signal for the current block based on the one or more prediction hypotheses and the weight. Video decoder 300 may encode the current block based on the prediction signal.

For example, video decoder 300 may be configured to determine a plurality of template matching costs for each of the plurality of weights, and determine the weight that corresponds to the plurality of template matching costs having a minimum template matching cost. As another example, video decoder 300 may construct a list of weights based on the plurality of weights, and receive an index into the list of weights. Video decoder 300 may sort the list of weights (e.g., the weights of the plurality of weights) based on the plurality of template matching costs, and receive the index in the sorted list.

Video decoder 300 may be configured to receive information indicative of residual values, the residual values being indicative of a difference between the current block and the prediction signal. Video decoder 300 may reconstruct the current block based on the prediction signal and the residual values.

Figure 4:
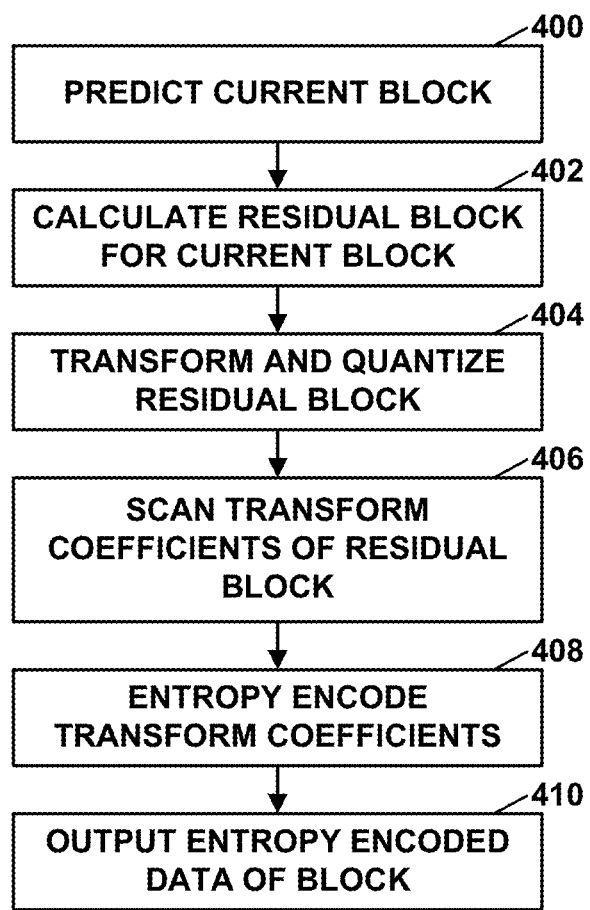
FIG. 4 is a flowchart illustrating an example method for encoding a current block in accordance with the techniques of this disclosure.

FIG. 4 is a flowchart illustrating an example method for encoding a current block in accordance with the techniques of this disclosure. The current block may be or include a current CU. Although described with respect to video encoder 200 (FIGS. 1 and 2), it should be understood that other devices may be configured to perform a method similar to that of FIG. 4.

In this example, video encoder 200 initially predicts the current block (400). For example, video encoder 200 may form a prediction block for the current block, and determine a prediction signal using the example techniques described in this disclosure. Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404). Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. Video encoder 200 may then output the entropy encoded data of the block (410).

Figure 5:
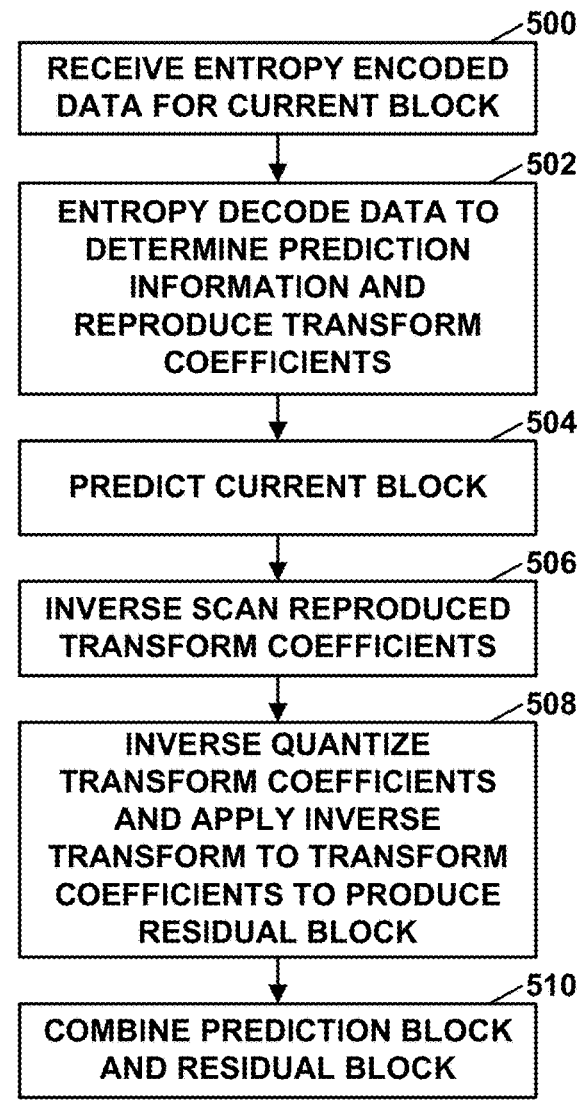
FIG. 5 is a flowchart illustrating an example method for decoding a current block in accordance with the techniques of this disclosure.

FIG. 5 is a flowchart illustrating an example method for decoding a current block of video data in accordance with the techniques of this disclosure. The current block may be or include a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block, including the prediction signal for the current block using the techniques described in this disclosure. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may ultimately decode the current block by combining the prediction block and the residual block (510).

Figure 10:
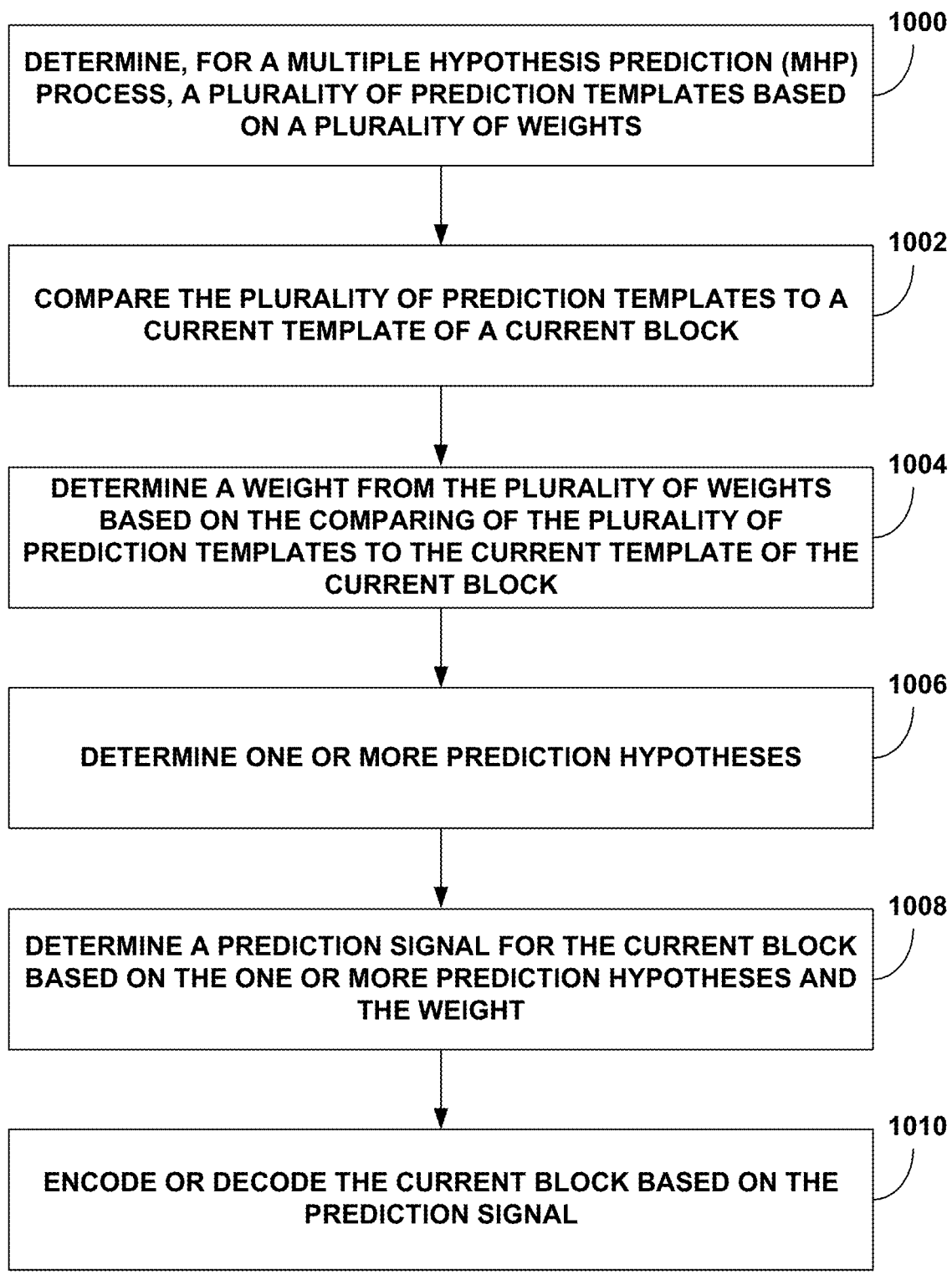
FIG. 10 is a flowchart illustrating an example method of operation.

FIG. 10 is a flowchart illustrating an example method of operation. In general, the example techniques of FIG. 10 may be performed by both video encoder 200 and video decoder 300. Therefore, the example of FIG. 10 is described with respect to processing circuitry. Examples of the processing circuitry includes fixed-function and/or programmable circuitry of video encoder 200 and video decoder 300. For instance, one or more memories may be configured to store video data. Examples of the one or more memories includes memory 106, memory 120, video data memory 230, decoded picture buffer 218, CPB memory 320, DPB 314, or some other memory including distributed memory. The processing circuitry of video encoder 200 or video decoder 300 may be coupled to the one or more memories and configured to perform the example techniques of FIG. 10.

The processing circuitry of video encoder 200 or video decoder 300 may determine, for a multiple hypothesis prediction (MHP) process, a plurality of prediction templates based on a plurality of weights (1000). For example, to determine the plurality of prediction templates based on the plurality of weights, the processing circuitry of video encoder 200 and video decoder 300 may determine a first prediction template based on a reference template, a hypothesis template, and a first weight of the plurality of weights, and determine a second prediction template based on the reference template, the hypothesis template, and a second weight of the plurality of weights.

In one or more examples, the reference template may be samples that neighbor a reference block pointed to by a motion or block vector. The hypothesis template may be samples that neighbor a prediction hypothesis. The prediction hypothesis may be previously encoded or decoded blocks in the same or different picture as the current block. The first weight and the second weight may be example weights of the plurality of weights.

As an example, to determine the first prediction template, the processing circuitry of video encoder 200 and video decoder 300 may determine that: $T_{pred1}=(1-\alpha_1)T_{ref}+\alpha_1 T_{add}$, where $T_{pred1}$ is the first prediction template, $\alpha_1$ is the first weight, $T_{ref}$ is the reference template, and $T_{add}$ is the hypothesis template. To determine the second prediction template, the processing circuitry of video encoder 200 and video decoder 300 may determine that: $T_{pred2}=(1-\alpha_2)T_{ref}+\alpha_2 T_{add}$, wherein $T_{pred2}$ is the second prediction template, $\alpha_2$ is the second weight, $T_{ref}$ is the reference template, and $T_{add}$ is the hypothesis template. The processing circuitry may repeat these operations for each weight of the plurality of weights.

In some examples, there may be a plurality of hypothesis templates or a plurality of reference templates, and the processing circuitry of video encoder 200 and video decoder 300 may repeat such techniques for each weight of the plurality of weights, each reference template of a plurality of reference templates, and each hypothesis template of a plurality of hypothesis templates. For example, the hypothesis template may be a first hypothesis template, and the processing circuitry of video encoder 200 or video decoder 300 may determine a third prediction template based on the reference template, a second hypothesis template, and the first weight of the plurality of weights, and determine a fourth prediction template based on the reference template, the second hypothesis template, and the second weight of the plurality of weights.

With these various example techniques, the processing circuitry of video encoder 200 or video decoder 300 may determine a plurality of prediction templates based on a plurality of weights. The processing circuitry of video encoder 200 or video decoder 300 may compare the plurality of prediction templates to a current template of a current block (1002). The current template may be samples that neighbor the current block. As one example, to compare, the processing circuitry of video encoder 200 or video decoder 300 may determine a template matching cost for each of the plurality of prediction templates, such as based on an SAD determination between each of the plurality of prediction templates and the current template of the current block.

The processing circuitry of video encoder 200 and video decoder 300 may determine a weight from the plurality of weights based on the comparing of the plurality of prediction templates to the current template of the current block (1004). As one example, the processing circuitry of video encoder 200 and video decoder 300 may determine which one of the prediction templates is associated with the lowest temporal matching cost (e.g., has minimal difference with current template). The processing circuitry of video encoder 200 and video decoder 300 may determine weight used to calculate the prediction template having the lowest temporal matching cost as the weight that is to be used for the MHP process.

As another example, the processing circuitry of video encoder 200 or video decoder 300 may construct a list based on the comparing of the plurality of prediction templates to the current template of the current block. For example, the processing circuitry of video encoder 200 or video decoder 300 may identify weights and/or prediction hypotheses associated with the prediction template having the lowest temporal matching cost in a first entry of the list, identify weights and/or prediction hypotheses associated with the prediction template having the next lowest temporal matching cost in a second entry of the list, and so forth. The processing circuitry of video encoder 200 may signal and the processing circuitry of video decoder 300 may receive an index for an entry into the list that the processing circuitry of video decoder 300 uses to determine the weight that is to be used for the MHP process, and in some examples, the prediction hypotheses that are to be used.

The processing circuitry of video encoder 200 or video decoder 300 may determine one or more prediction hypotheses (1006). As one example, the processing circuitry of video encoder 200 may signal and the processing circuitry of video decoder 300 may receive information that identifies the one or more prediction hypotheses.

In some examples, the processing circuitry of video encoder 200 or video decoder 300 may determine the one or more prediction hypotheses based on the comparing of the plurality of prediction templates to the current template of the current block. For example, such as where the processing circuitry of video encoder 200 and video decoder 300 cycled through a plurality of prediction hypotheses, the processing circuitry of video encoder 200 and video decoder 300 may determine the prediction hypotheses associated with the prediction template(s) having the lowest temporal matching cost, and select those prediction hypotheses as the one or more prediction hypotheses used for the MHP process. As another example, the processing circuitry of video encoder 200 may signal and the processing circuitry of video decoder 300 may receive an index for an entry in the list, described above, and the processing circuitry of video decoder 300 may determine the one or more prediction hypotheses based on the index for an entry in the list or indices for entries in the list.

The processing circuitry of video encoder 200 or video decoder 300 may determine a prediction signal for the current block based on the one or more prediction hypotheses and the weight (1008). For example, the processing circuitry of video encoder 200 or video decoder 300 may apply the weight to at least one prediction hypothesis of the one or more prediction hypotheses, and combine a base prediction signal and the at least one prediction hypothesis having the weight applied to determine the prediction signal for the current block. For instance, the processing circuitry of video encoder 200 or video decoder 300 may determine $p_3=(1-\alpha)p_{uni/bi}+\alpha h_3$. In this example, the determined weight (e.g., $\alpha$, which is determined using the above example techniques) is applied to h3, which is a prediction hypothesis. For instance, as described above, $p_3$ is the prediction signal, $\alpha$ is the weight that is determined using above techniques of template matching (e.g., comparing the plurality of prediction templates to a current template of a current block), and $h_3$ is the prediction hypothesis (e.g., determined by video encoder 200 and signaled to video decoder 300 or determined using the template matching described above).

The processing circuitry of video encoder 200 or video decoder 300 may perform similar techniques if there are more than one prediction hypothesis (e.g., where $p_{n+1}=(1-\alpha_{n+1})p_n+\alpha_{n+1}h_{n+1}$). For example, the processing circuitry of video encoder 200 or video decoder 300 may perform the above example techniques to determine respective weights for each of the plurality hypotheses.

The processing circuitry of video encoder 200 or video decoder 300 may encode or decode the current block based on the prediction signal (1010). For example, to decode the current block, the processing circuitry of video decoder 300 may determine residual values indicative of a difference between the prediction signal and the current block, and add the residual values to the prediction signal to reconstruct the current block. To encode the current block, the processing circuitry of video encoder 200 may determine residual values indicative of a difference between the prediction signal and the current block, and signal information indicative of the residual values.

The following numbered clauses illustrate one or more aspects of the devices and techniques described in this disclosure.

Clause 1. A method of encoding or decoding video data, the method comprising: determining a plurality of weights based on a current template for a current block and a reference template for a reference; determining a weight to apply for a multiple hypothesis prediction (MHP) process from the plurality of weights, wherein the MHP process comprises: determining a prediction signal for the current block based on a prediction block, one or more prediction hypotheses, and the weight; and encoding or decoding the current block based on the prediction signal.

Clause 2. The method of clause 1, further comprising: determining a plurality of template matching costs for each of the plurality of weights, wherein determining the weight comprises determining the weight that corresponds to the plurality of template matching costs having a minimum template matching cost.

Clause 3. The method of clause 1, further comprising: constructing a list of weights based on the plurality of weights, wherein determining the weight comprises receiving an index into the list of weights.

Clause 4. The method of clause 3, wherein the list of weights includes weights for less than all of the plurality of weights.

Clause 5. The method of any of clauses 3 and 4, further comprising: determining a plurality of template matching costs for each of the plurality of weights, wherein constructing the list of weights comprises sorting the weights of the plurality of weights based on the plurality of template matching costs.

Clause 6. The method of any of clauses 1-5, further comprising constructing a merge list.

Clause 7. The method of clause 6, wherein the one or more prediction hypotheses are based on a motion vector offset added to a merge candidate in the merge list.

Clause 8. The method of any of clauses 6 and 7, further comprising performing adaptive reordering of merge candidates (ARMC) on the merge list, wherein the one or more prediction hypotheses are based on the merge list after performing ARMC on the merge list.

Clause 9. The method of any of clauses 1-5, further comprising: constructing an advance motion vector predictor (AMVP) list; and performing adaptive reordering of merge candidates (ARMC) on the AMVP list, wherein the one or more prediction hypotheses are based on the AMVP list after performing ARMC on the AMVP list.

Clause 10. The method of any of clauses 1-9, wherein encoding or decoding the current block based on the prediction signal comprises decoding the current block, and wherein decoding the current block comprises: receiving information indicative of residual values, the residual values being indicative of a difference between the current block and the prediction signal; and reconstructing the current block based on the prediction signal and the residual values.

Clause 11. The method of any of clauses 1-9, wherein encoding or decoding the current block based on the prediction signal comprises encoding the current block, and wherein encoding the current block comprises: determining residual values indicative of a difference between the current block and the prediction signal; and signaling information indicative of the residual values.

Clause 12. A device for encoding or decoding video data, the device comprising: memory configured to store the video data; and one or more processors implemented in circuitry coupled to the memory and configured to perform the method of any of clauses 1-11.

Clause 13. The device of clause 12, further comprising a display configured to display decoded video data.

Clause 14. The device of any of clauses 12 and 13, wherein the device comprises one or more of a camera, a computer, a mobile device, a broadcast receiver device, or a set-top box.

Clause 15. A computer-readable storage medium having stored thereon instructions that, when executed, cause one or more processors to perform the method of any of clause 1-11.

Clause 16. A device for encoding or decoding video data, the device comprising means for performing the method of any of clauses 1-11.

Clause 1A. A method of encoding or decoding video data, the method comprising: determining, for a multiple hypothesis prediction (MHP) process, a plurality of prediction templates based on a plurality of weights; comparing the plurality of prediction templates to a current template of a current block; determining a weight from the plurality of weights based on the comparing of the plurality of prediction templates to the current template of the current block; determining one or more prediction hypotheses; determining a prediction signal for the current block based on the one or more prediction hypotheses and the weight; and encoding or decoding the current block based on the prediction signal.

Clause 2A. The method of clause 1A, wherein determining the plurality of prediction templates based on the plurality of weights comprises: determining a first prediction template based on a reference template, a hypothesis template, and a first weight of the plurality of weights; and determining a second prediction template based on the reference template, the hypothesis template, and a second weight of the plurality of weights.

Clause 3A. The method of clause 2A, wherein determining the first prediction template comprises: Tpred1=(1−α1)Tref+α1Tadd, wherein Tpred1 is the first prediction template, α1 is the first weight, Tref is the reference template, and Tadd is the hypothesis template.

Clause 4A. The method of clause 3A, wherein determining the second prediction template comprises: $Tpred2=(1-\alpha2)Tref+\alpha2Tadd$, wherein Tpred2 is the second prediction template, α2 is the second weight, Tref is the reference template, and $T_{add}$ is the hypothesis template.

Clause 5A. The method of any of clauses 2A-4A, wherein the hypothesis template is a first hypothesis template, the method further comprising: determining a third prediction template based on the reference template, a second hypothesis template, and the first weight of the plurality of weights; and determining a fourth prediction template based on the reference template, the second hypothesis template, and the second weight of the plurality of weights.

Clause 6A. The method of any of clauses 1A-5A, further comprising: constructing a list based on the comparing of the plurality of prediction templates to the current template of the current block, and wherein determining the weight comprises determining the weight based on an entry in the list.

Clause 7A. The method of any of clauses 1A-6A, wherein determining the one or more prediction hypotheses comprises determining the one or more prediction hypotheses based on the comparing of the plurality of prediction templates to the current template of the current block.

Clause 8A. The method of any of clauses 1A-7A, wherein determining the prediction signal for the current block based on the one or more prediction hypotheses and the weight comprises: applying the weight to at least one prediction hypothesis of the one or more prediction hypotheses; and combining a base prediction signal and the at least one prediction hypothesis having the weight applied to determine the prediction signal for the current block.

Clause 9A. The method of any of clauses 1A-8A, wherein encoding or decoding the current block based on the prediction signal comprises decoding the current block, wherein decoding the current block comprises: determining residual values indicative of a difference between the prediction signal and the current block; and adding the residual values to the prediction signal to reconstruct the current block.

Clause 10A. The method of any of clauses 1A-8A, wherein encoding or decoding the current block based on the prediction signal comprises encoding the current block, wherein encoding the current block comprises: determining residual values indicative of a difference between the prediction signal and the current block; and signaling information indicative of the residual values.

Clause 11A. A device for encoding or decoding video data, the device comprising: one or more memories configured to store the video data; and processing circuitry coupled to the one or more memories, wherein the processing circuitry is configured to: determine, for a multiple hypothesis prediction (MHP) process, a plurality of prediction templates based on a plurality of weights; compare the plurality of prediction templates to a current template of a current block; determine a weight from the plurality of weights based on the comparing of the plurality of prediction templates to the current template of the current block; determine one or more prediction hypotheses; determine a prediction signal for the current block based on the one or more prediction hypotheses and the weight; and encode or decode the current block based on the prediction signal.

Clause 12A. The device of clause 11A, wherein to determine the plurality of prediction templates based on the plurality of weights, the processing circuitry is configured to: determine a first prediction template based on a reference template, a hypothesis template, and a first weight of the plurality of weights; and determine a second prediction template based on the reference template, the hypothesis template, and a second weight of the plurality of weights.

Clause 13A. The device of clause 12A, wherein to determine the first prediction template, the processing circuitry is configured to determine that: $T_{pred1}=(1-\alpha1)Tref+\alpha1Tadd$, wherein Tpred1 is the first prediction template, α1 is the first weight, Tref is the reference template, and Tadd is the hypothesis template.

Clause 14A. The device of clause 13A, wherein to determine the second prediction template, the processing circuitry is configured to determine that: $Tpred2=(1-\alpha2)Tref+\alpha2Tadd$, wherein Tpred2 is the second prediction template, α2 is the second weight, Tref is the reference template, and Tadd is the hypothesis template.

Clause 15A. The device of any of clauses 12A-14A, wherein the hypothesis template is a first hypothesis template, and wherein the processing circuitry is configured to: determine a third prediction template based on the reference template, a second hypothesis template, and the first weight of the plurality of weights; and determine a fourth prediction template based on the reference template, the second hypothesis template, and the second weight of the plurality of weights.

Clause 16A. The device of any of clauses 11A-15A, wherein the processing circuitry is configured to: construct a list based on the comparing of the plurality of prediction templates to the current template of the current block; and wherein to determine the weight, the processing circuitry is configured to determine the weight based on an entry in the list.

Clause 17A. The device of any of clauses 11A-16A, wherein to determine the one or more prediction hypotheses, the processing circuitry is configured to determine the one or more prediction hypotheses based on the comparing of the plurality of prediction templates to the current template of the current block.

Clause 18A. The device of any of clauses 11A-17A, wherein to determine the prediction signal for the current block based on the one or more prediction hypotheses and the weight, the processing circuitry is configured to: apply the weight to at least one prediction hypothesis of the one or more prediction hypotheses; and combine a base prediction signal and the at least one prediction hypothesis having the weight applied to determine the prediction signal for the current block.

Clause 19. The device of any of clauses 11A-18A, wherein to encode or decode the current block based on the prediction signal, the processing circuitry is configured to decode the current block, wherein to decode the current block, the processing circuitry is configured to: determine residual values indicative of a difference between the prediction signal and the current block; and add the residual values to the prediction signal to reconstruct the current block.

Clause 20A. A computer-readable storage medium storing instructions thereon that when executed cause one or more processors to: determine, for a multiple hypothesis prediction (MHP) process, a plurality of prediction templates based on a plurality of weights; compare the plurality of prediction templates to a current template of a current block; determine a weight from the plurality of weights based on the comparing of the plurality of prediction templates to the current template of the current block; determine one or more prediction hypotheses; determine a prediction signal for the current block based on the one or more prediction hypotheses and the weight; and encode or decode the current block based on the prediction signal.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding video data, the method comprising:
   determining, for a multiple hypothesis prediction (MHP) process, a plurality of prediction templates based on a plurality of weights;
   comparing the plurality of prediction templates to a current template of a current block;
   determining a weight from the plurality of weights based on the comparing of the plurality of prediction templates to the current template of the current block;
   determining one or more prediction hypotheses;
   determining a prediction signal for the current block based on the one or more prediction hypotheses and the weight; and
   encoding or decoding the current block based on the prediction signal.

2. The method of claim 1, wherein determining the plurality of prediction templates based on the plurality of weights comprises:
   determining a first prediction template based on a reference template, a hypothesis template, and a first weight of the plurality of weights; and
   determining a second prediction template based on the reference template, the hypothesis template, and a second weight of the plurality of weights.

3. The method of claim 2, wherein determining the first prediction template comprises:
   $T_{pred1}=(1-\alpha_1)T_{ref}+\alpha_1 T_{add}$, wherein $T_{pred1}$ is the first prediction template, $\alpha_1$ is the first weight, $T_{ref}$ is the reference template, and $T_{add}$ is the hypothesis template.

4. The method of claim 3, wherein determining the second prediction template comprises:
   $T_{pred2}=(1-\alpha_2)T_{ref}+\alpha_2 T_{add}$, wherein $T_{pred2}$ is the second prediction template, $\alpha_2$ is the second weight, $T_{ref}$ is the reference template, and $T_{add}$ is the hypothesis template.

5. The method of claim 2, wherein the hypothesis template is a first hypothesis template, the method further comprising:
   determining a third prediction template based on the reference template, a second hypothesis template, and the first weight of the plurality of weights; and
   determining a fourth prediction template based on the reference template, the second hypothesis template, and the second weight of the plurality of weights.

6. The method of claim 1, further comprising:
   constructing a list based on the comparing of the plurality of prediction templates to the current template of the current block, and
   wherein determining the weight comprises determining the weight based on an entry in the list.

7. The method of claim 1, wherein determining the one or more prediction hypotheses comprises determining the one or more prediction hypotheses based on the comparing of the plurality of prediction templates to the current template of the current block.

8. The method of claim 1, wherein determining the prediction signal for the current block based on the one or more prediction hypotheses and the weight comprises:
applying the weight to at least one prediction hypothesis of the one or more prediction hypotheses; and
combining a base prediction signal and the at least one prediction hypothesis having the weight applied to determine the prediction signal for the current block.

9. The method of claim 1, wherein encoding or decoding the current block based on the prediction signal comprises decoding the current block, wherein decoding the current block comprises:
determining residual values indicative of a difference between the prediction signal and the current block; and
adding the residual values to the prediction signal to reconstruct the current block.

10. The method of claim 1, wherein encoding or decoding the current block based on the prediction signal comprises encoding the current block, wherein encoding the current block comprises:
determining residual values indicative of a difference between the prediction signal and the current block; and
signaling information indicative of the residual values.

11. A device for encoding or decoding video data, the device comprising:
one or more memories configured to store the video data; and
processing circuitry coupled to the one or more memories, wherein the processing circuitry is configured to:
determine, for a multiple hypothesis prediction (MHP) process, a plurality of prediction templates based on a plurality of weights;
compare the plurality of prediction templates to a current template of a current block;
determine a weight from the plurality of weights based on the comparing of the plurality of prediction templates to the current template of the current block;
determine one or more prediction hypotheses;
determine a prediction signal for the current block based on the one or more prediction hypotheses and the weight; and
encode or decode the current block based on the prediction signal.

12. The device of claim 11, wherein to determine the plurality of prediction templates based on the plurality of weights, the processing circuitry is configured to:
determine a first prediction template based on a reference template, a hypothesis template, and a first weight of the plurality of weights; and
determine a second prediction template based on the reference template, the hypothesis template, and a second weight of the plurality of weights.

13. The device of claim 12, wherein to determine the first prediction template, the processing circuitry is configured to determine that:
$T_{pred1}=(1-\alpha_1)T_{ref}+\alpha_1 T_{add}$, wherein $T_{pred1}$ is the first prediction template, $\alpha_1$ is the first weight, $T_{ref}$ is the reference template, and $T_{add}$ is the hypothesis template.

14. The device of claim 13, wherein to determine the second prediction template, the processing circuitry is configured to determine that:
$T_{pred2}=(1-\alpha_2)T_{ref}+\alpha_2 T_{add}$, wherein $T_{pred2}$ is the second prediction template, $\alpha_2$ is the second weight, $T_{ref}$ is the reference template, and $T_{add}$ is the hypothesis template.

15. The device of claim 12, wherein the hypothesis template is a first hypothesis template, and wherein the processing circuitry is configured to:
determine a third prediction template based on the reference template, a second hypothesis template, and the first weight of the plurality of weights; and
determine a fourth prediction template based on the reference template, the second hypothesis template, and the second weight of the plurality of weights.

16. The device of claim 11, wherein the processing circuitry is configured to:
construct a list based on the comparing of the plurality of prediction templates to the current template of the current block; and
wherein to determine the weight, the processing circuitry is configured to determine the weight based on an entry in the list.

17. The device of claim 11, wherein to determine the one or more prediction hypotheses, the processing circuitry is configured to determine the one or more prediction hypotheses based on the comparing of the plurality of prediction templates to the current template of the current block.

18. The device of claim 11, wherein to determine the prediction signal for the current block based on the one or more prediction hypotheses and the weight, the processing circuitry is configured to:
apply the weight to at least one prediction hypothesis of the one or more prediction hypotheses; and
combine a base prediction signal and the at least one prediction hypothesis having the weight applied to determine the prediction signal for the current block.

19. The device of claim 11, wherein to encode or decode the current block based on the prediction signal, the processing circuitry is configured to decode the current block, wherein to decode the current block, the processing circuitry is configured to:
determine residual values indicative of a difference between the prediction signal and the current block; and
add the residual values to the prediction signal to reconstruct the current block.

20. A non-transitory computer-readable storage medium storing instructions thereon that when executed cause one or more processors to:
determine, for a multiple hypothesis prediction (MHP) process, a plurality of prediction templates based on a plurality of weights;
compare the plurality of prediction templates to a current template of a current block;
determine a weight from the plurality of weights based on the comparing of the plurality of prediction templates to the current template of the current block;
determine one or more prediction hypotheses;
determine a prediction signal for the current block based on the one or more prediction hypotheses and the weight; and
encode or decode the current block based on the prediction signal.

* * * * *